(12) United States Patent  (10) Patent No.: US 8,089,953 B2
Angelot et al.  (45) Date of Patent: Jan. 3, 2012

(54) METHOD AND SYSTEM FOR NETWORK ENTITY CONFIGURATION

(75) Inventors: Stephane Angelot, Carrollton, TX (US); David Sayson, Vancouver (CA)

(73) Assignee: AASTRA Technologies Limited, Concord (CA)

( * ) Notice: Subject to any disclaimer, the term of this patent is extended or adjusted under 35 U.S.C. 154(b) by 685 days.

(21) Appl. No.: 11/925,632

(22) Filed: Oct. 26, 2007

(65) Prior Publication Data

US 2009/0201830 A1  Aug. 13, 2009

Related U.S. Application Data

(60) Provisional application No. 60/863,616, filed on Oct. 31, 2006.

(51) Int. Cl.
*H04L 12/28* (2006.01)
*G06F 15/16* (2006.01)

(52) U.S. Cl. .......................... 370/351; 709/220

(58) Field of Classification Search .................. None
See application file for complete search history.

(56) References Cited

U.S. PATENT DOCUMENTS

| 2002/0002611 | A1 | 1/2002 | Vange |
| 2003/0235182 | A1* | 12/2003 | McMullin ............... 370/352 |
| 2004/0230965 | A1* | 11/2004 | Okkonen ............... 717/168 |
| 2005/0015499 | A1* | 1/2005 | Mayer ................... 709/228 |
| 2005/0021698 | A1* | 1/2005 | Devarakonda et al. ....... 709/220 |
| 2005/0031108 | A1* | 2/2005 | Eshun et al. ............ 379/201.12 |
| 2005/0235352 | A1* | 10/2005 | Staats et al. ............ 726/14 |
| 2005/0249196 | A1* | 11/2005 | Ansari et al. ............ 370/352 |
| 2006/0123079 | A1 | 6/2006 | Sturniolo et al. |
| 2006/0173985 | A1 | 8/2006 | Moore |
| 2006/0174018 | A1* | 8/2006 | Zhu et al. .............. 709/229 |
| 2007/0130156 | A1* | 6/2007 | Tenhunen et al. ........ 707/10 |
| 2007/0266113 | A1* | 11/2007 | Koopmans et al. ....... 709/217 |

* cited by examiner

*Primary Examiner* — Hassan Phillips
*Assistant Examiner* — Eunsook Choi

(57) ABSTRACT

A system for configuring a plurality of network entities by a central server, each of the network entities being associated with a unique identifier, and each of the network entities being associated with at least one service provider having configuration settings data therefor.

10 Claims, 3 Drawing Sheets

| IP Device MAC address | 00-A1-B2-B3-C4-D5 | 00-54-11-A2-33-F6 | 00-54-11-A2-33-F6 | ......... | xx-xx-xx-xx-xx |
|---|---|---|---|---|---|
| SERVICE PROVIDER ID | SP 18a | SP 18b | SP 18c | ......... | SP 18x |
| Configuration server(s) (IP address) | 142.22.212.221 100.232.2.214 72.12.15.32 120.200.45.255 222.48.25.66 | 42.120.112.144 144.110.212.20 | 69.85.101.2 | ......... | yy.yyy.y.yyy |

*FIG. 3a*

| Configuration parameters for IP Device | Transport Mechanism (e.g. TFTP/FTP/HTTP/HTTPS Parameters for FTP/HTTP/HTTPS:<br>• Username/password for FTP<br>• Path for HTTP<br>• Path/Client Method (SSL or TLS) for HTTPS<br>Parameter n |
|---|---|

*FIG. 3b*

METHOD AND SYSTEM FOR NETWORK ENTITY CONFIGURATION

CROSS-REFERENCE TO RELATED APPLICATIONS

This application claims the benefit of priority to U.S. Provisional Application Ser. No. 60/863,616, filed 31 Oct. 2006.

BACKGROUND OF THE INVENTION

1. Field of the Invention

The present invention relates to packet switched networks, and more particularly to configuring network entities with the requisite settings in order to participate within a network.

2. Description of the Related Art

IP Telephony (VoIP) is a converged voice/data technology that uses the data network to carry voice (telephone) traffic, and is rapidly revolutionizing the world of enterprise communications. Some benefits of IP telephony include the ability to manage individual phone systems, access to a plethora of features and applications, improved reliability, improved performance, substantial cost savings and unified messaging.

Another key benefit of VoIP technology is that it allows networks to be built using either a centralized or a distributed architecture. In general, centralized architectures are associated with H.248 and MGCP. These protocols were designed for a centralized device called a media gateway controller or call agent that handles switching logic and call control. The centralized device communicates with the media gateways, which route and transmit the audio/media portion of the voice calls. In centralized architectures, the network intelligence is centralized and endpoints are relatively dumb with limited or no native features. Distributed architectures are associated with H.323 and SIP protocols. These protocols allow network intelligence to be distributed between endpoints and call-control devices. Intelligence in this instance refers to call state, calling features, call routing, configuring, billing, or any other aspect of call handling. The endpoints can be VoIP gateways, IP phones, media servers, or any device that can initiate and/or terminate a VoIP call. The call-control devices are called gatekeepers in an H.323 network, and proxy or redirect servers in a SIP network.

One significant difference between a POTS (plain old telephone service) network and a VoIP network is that some architectures and intelligent subscriber gateways and/or IP phones now reside on the customer premises. These devices may be very complex and require to be configured before use, unlike a POTS phone. Therefore easier configuration of subscriber gateways, or end points becomes important as the network scales up. In a hosted PBX or IP Centrex environment users simply plug their IP phone 12a into the LAN, and the IP phone 12a is auto-configured. However, to date, the issue of auto-configuration of IP endpoints in a non-hosted PBX, or non-IP centrex environment, has not been adequately or satisfactorily addressed. Typically, in a non-hosted PBX, or non-IP centrex environment, each customer end point must be configured, managed and maintained individually, and so the user is often tasked to manually enter the configuration settings for the device, such as the service provider's configuration server address or other network settings. Also, the user must usually prearrange IP telephony services with an Internet or VoIP service provider in order to select the configuration or services options.

Therefore, the user is burdened with the task of reviewing the installation guide, or other documentation in order to correctly connect the device to the network. The installation process is often not successful, as a certain level of knowledge of networking is assumed. Inevitably, the frustrated end-user contacts the service provider for support, and the service provider is faced with higher costs during the installation process as well as the ongoing support, operation, and upgrades. These costs are significant and can dramatically impact its profitability. Also, slower deployment leads to fewer subscriptions, lost market share, decreased ARPU, and customer churn.

For carriers delivering residential VoIP and other IP services, mass deployment represents a challenge, as a large number of devices have to be configured and supported. Typically, the devices are bought from different vendors, and so the devices generally require vendor-specific configuration settings which must be enabled in the phones for the end-user to enjoy the full functionality of the device. Also, mass deployment over the Internet is often impeded by lack of interoperability and complexity of configurations, and firewall/NAT issues.

It is an object of the present invention to mitigate or obviate at least one of the above-mentioned disadvantages.

SUMMARY OF THE INVENTION

In one of its aspects, the present invention provides a method for automatically configuring at least one network entity for participation in a network, the at least one network entity being associated with at least one service provider, the method comprising the steps of:

assigning an identifier to the at least one network entity;

associating the identifier with at least one service provider;

providing a central server having a reference table for mapping the identifiers to at least one of the service providers, providing a configuration server associated with each of the service providers, the configuration server having configuration settings data for the at least one network entity;

including in a computer-readable medium of the at least one network entity instructions for communicating with the central server or the configuration server;

causing the at least one network entity to automatically request configuration settings data from the central server when coupled to the network, the request including the network entity's identifier;

receiving the request at the central server and determining which of the at least one of the service providers is associated with the identifier;

the central server redirecting the request to an appropriate configuration server having the configuration settings data specific to the identifier;

the configuration server providing the configuration settings data to the at least one network entity; and whereby the at least one network entity is automatically configured without user intervention except to power-on and connect the at least one network entity to the network in order to contact the central server.

In another of its aspects, the present invention provides a system for configuring a plurality of network entities for implementation in a network with minimal end-user intervention, each of the network entities being associated with an identifier, and each of the network entities being associated with at least one service provider, the system having:

a computer-readable medium of each of the network entities having a program for executing instructions to communicatively couple each of the network entities to a central server to request configuration settings data matching the network entity's identifier, the central server including a first mapping table comprising a list of the identifiers associated with each of the service providers, the first mapping table being used to redirect the request to a appropriate configuration server associated with each of the service providers, the configuration server including a second mapping table comprising a list of the identifiers and the configuration settings data associated therewith.

In another of its aspects, the present invention provides a network entity for participating in a packet switched network, the network entity having a identifier and being configured automatically via a central server, the network entity being associated with at least one service provider, the network entity having:

a computer-readable medium comprising URI data for the central server and a program for executing instructions to communicatively couple the network entity to the central server via the network, and to request configuration settings data matching the network entity's identifier; the request being redirected to an appropriate configuration server based on the identifier, the configuration server having configuration settings data associated with the identifier and specific to the network entity.

In another of its aspects, the present invention provides a machine-readable medium having embodied thereon a computer program for processing by a central server, the computer program for providing instructions to configure a plurality of network devices associated with a plurality of service providers, each network device having an identifier, the instructions being provided in response to requests for configuration settings data from the network devices, the request including the identifier, the machine-readable medium comprising:

a first sub-program coded to associate the identifier to at least one of the service providers to form a first mapping table for each service provider, the first sub-program coded to analyze the requests from each of the network devices, and to determine whether the first mapping table comprises the identifier;

a second sub-program coded to redirect each of the requests to an appropriate service provider based on the identifier; the configuration server including a second mapping table comprising a list of the identifiers and the configuration settings data associated therewith.

In another of its aspects, the present invention provides a redirect server to be implemented within a network having at least one network device, the redirect server for auto-configuring the network devices, the network devices being associated with different service providers, and at least one of the service providers requiring specific configuration settings data for each of the network devices, each of the network devices having an identifier, the redirect server comprising:

a machine-readable medium having embodied thereon a computer program for processing by the redirect server, the computer program coded to provide instructions for configuring the network devices, the instructions being provided in response to requests for configuration settings data from the network devices, each of the requests including the identifier, the machine-readable medium comprising:

a first sub-program coded to associate the identifier with at least one of the service providers to form a first mapping table; the first sub-program coded to analyze each of the requests from the network devices, and to determine whether the first mapping table comprises the identifier;

a second sub-program coded to redirect each of the requests to an appropriate service provider based on the identifier; the configuration server including a second mapping table comprising a list of the identifiers and the configuration settings data associated therewith.

Advantageously, by facilitating substantially hassle-free installations or configuration of IP endpoints for end-users, the operational burden of service activation, requests for support for installation or technical assistance are substantially diminished or eliminated. Consequently, service providers are presented with a competitive time-to market and a service cost advantage. Additionally, service providers have the freedom to choose any number of IP endpoints from numerous manufacturers without being concerned about the resources normally required to provision the IP endpoints using prior art methods.

BRIEF DESCRIPTION OF THE DRAWINGS

Several preferred embodiments of the present invention will now be described, by way of example only, with reference to the appended drawings in which:

FIG. 3a is an exemplary first mapping table comprising IP device information and associated service provider.

FIG. 3b is an exemplary second mapping table comprising IP device information and associated configuration parameters.

DETAILED DESCRIPTION OF EXEMPLARY EMBODIMENTS

Figure 1:
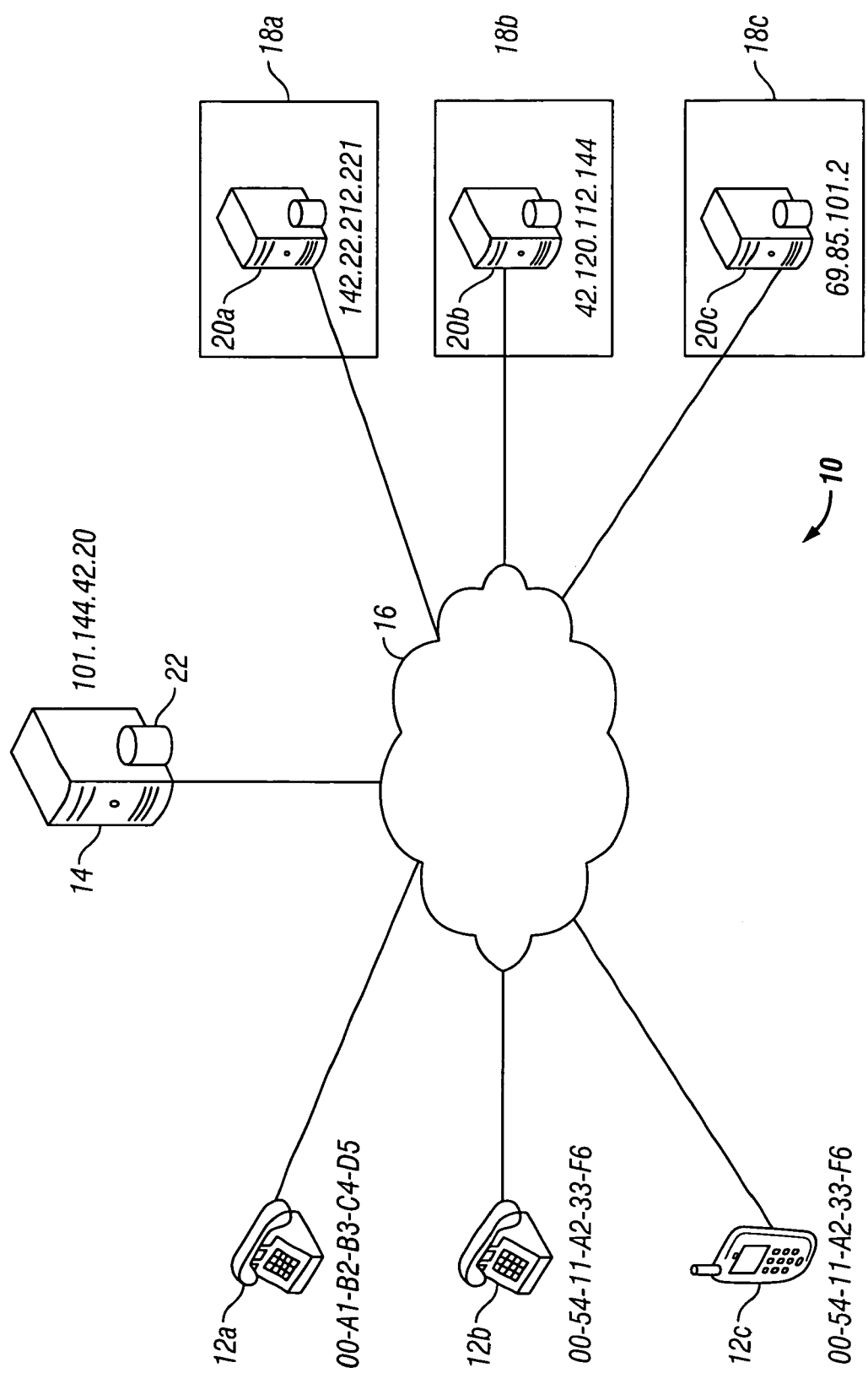
FIG. 1 shows a schematic diagram of a system for configuring an IP device, in a preferred embodiment.

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may also be described herein in terms of screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like.

As is known in the art, Internet Protocol (IP) is a routing protocol designed to route traffic within a network or between networks. IP is described in IETF RFC-791, incorporated herein by reference. However, the present invention is not limited to IP data interfaces and other data interfaces can also be used.

FIG. 1 illustrates a system 10 for configuring a plurality of network entities 12a, 12b, 12c via a central server 14 with minimal end-user intervention, wherein minimal user intervention involves powering on and connecting the network entity 12a, 12b, or 12c to a network 16. The network entities 12a, 12b, 12c may be any IP device or endpoint (end node) for participating in a packet switched network, such as, but not limited to, IP phones, H.323 phones, DECT phones, SIP-DECT phones, ATAs, mobile phones, IPTVs, projectors, PDAs, digital cameras, PC, MP3 players, set-top boxes, game consoles, gateways, soft phones, firewalls, access-points, modems, network appliances, or any combination(s) thereof. These exemplary network entities 12a, 12b, 12c include a data processing means comprising a processor (which may be referred to as a central processor unit or CPU, logic means, or controller) that is in communication with a machine-readable medium (computer-readable medium), input/output (I/O) devices, a network interface, and other interfaces. A computer-readable medium is any physical object that can store information in a form directly readable by a computer. Thus, magnetic, optical, and electrical storage devices are all contemplated, as well as any other method of storing information directly accessible to a computer. Hard disks, floppy disks, CD/DVD ROM drives, RAM chips, magnetic tapes, barcodes, punch cards, and the like are all examples of computer-readable media.

The network 16 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Generally, the network entities 12a, 12b, 12c are vended to a plurality of service providers 18a, 18b, 18c by a manufacturer or a distributor. The network entities 12a, 12b, 12c are provisioned with a unique resource identifier (URI) of the central server 14 already embedded in the firmware, including other instruction codes/software programs stored in the computer-readable medium. The software application code may also be implemented in hardware via a dedicated device incorporating control logic or a controller, for example. The software application code includes software instructions to be executed by the processor. Alternatively, the software may be executed by a controller, or control logic on the device. The central server 14 is preferably remotely based and serves as a central depository of configuration information related to the network entities 12a, 12b, 12c, and may be communicatively coupled to a plurality of configuration servers 20a, 20b, 20c, or other entities on the network 16. The central server 14 and configuration servers 20a, 20b, 20c, also include data processing means comprising a processor (which may be referred to as a central processor unit or CPU, logic means, or controller) that is in communication with a computer-readable medium having data and/or program code, input/output (I/O) devices, a network interface, and other interfaces. The central server 14 and configuration servers 20a, 20b, 20c are scalable, robust and include failover capabilities and built-in redundancies.

After the network entities 12a, 12b, 12c are first powered on and communicatively coupled to the network via a network interface, the network entities 12a, 12b, 12c automatically execute a program to contact the central server 14, out of the box. The term "communicatively coupled" is used in its broadest sense to mean coupling in any fashion that allows information to be passed between network entities 12a, 12b, 12c, and other network devices within the network 16, such as the central server 14, configuration servers 20a, 20b or 20c, or other servers, gateways, routers, switches, and so forth. Thus, for example, communicatively coupled network entities 12a, 12b, 12c can be coupled either directly or indirectly via electromagnetic signals, such as electrically coupled, optically coupled, wirelessly coupled; and/or physically coupled. The network entities 12a, 12b, 12c thus send a request for configuration settings from the central server 14. As each of the network entities 12a, 12b or 12c may be procured from different manufacturers (OEMs), the configuration settings thus tend to be manufacturer-specific.

Upon receipt of the configuration settings request, the central server 14 identifies the querying network entity 12a, 12b, or 12c, and the central server 14 responds with a URI to an appropriate configuration server 20a, 20b, or 20c associated with one of the service providers 18a, 18b, 18c, holding the actual configuration for the network entity 12a, 12b, or 12c. Alternatively, the central server 14 forwards the query to the appropriate configuration server 20a, 20b, 20c based on the identity of the network entity 12a, 12b, or 12c. As such, the central server 14 redirects any configuration related queries from the network entity 12a, 12b, or 12c to the configuration server 20a, 20b, 20c, therefore the central server 14 may be also be termed a "redirect server". In either case, the configuration settings are provided to the network entity 12a, 12b, or 12c, and so each of the network entities 12a, 12b, or 12c is automatically configured without requiring any manual input of settings by the user.

Figure 2:
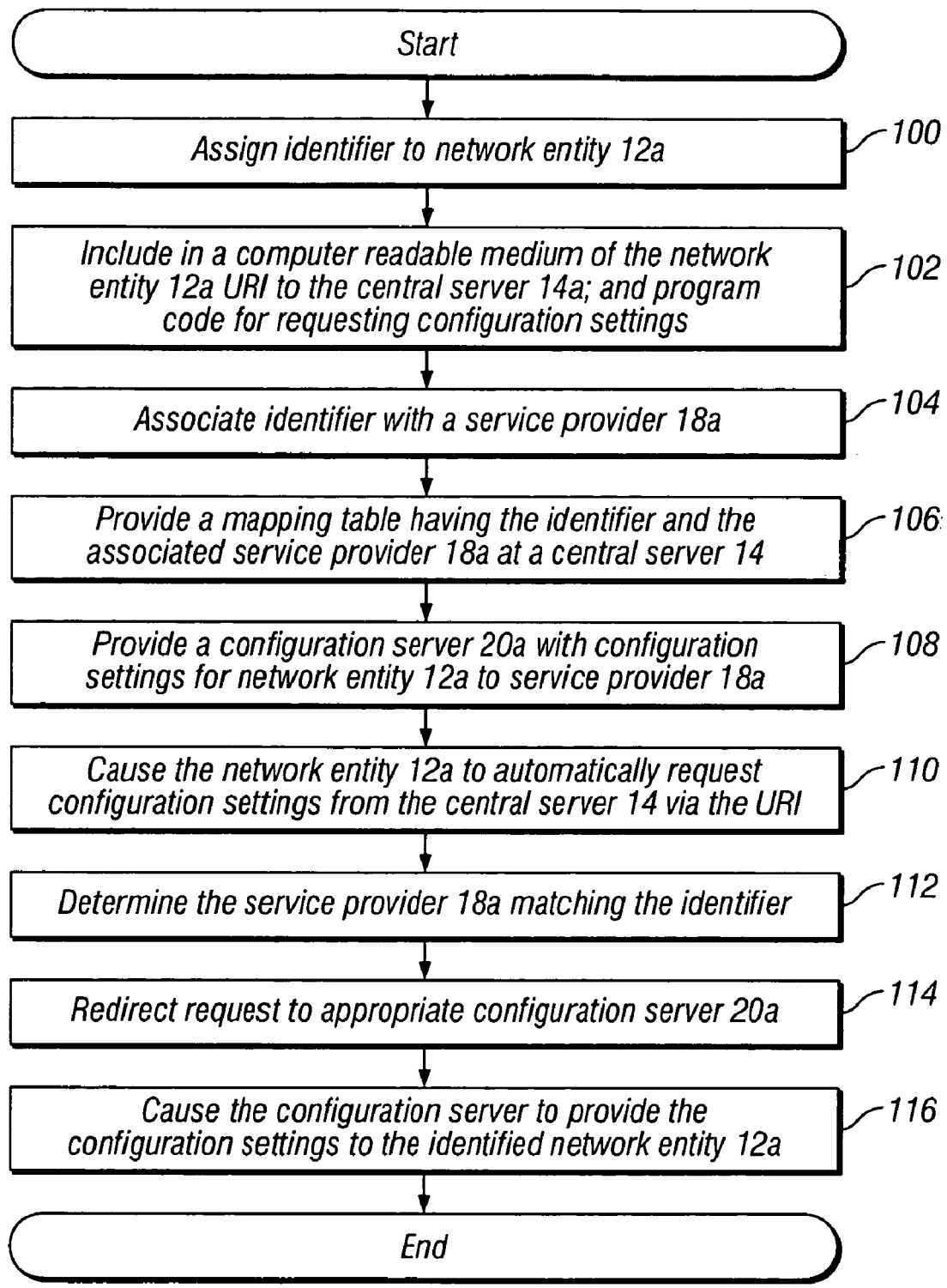
FIG. 2 is a flowchart outlining exemplary steps in a method for configuring an IP device.

Referring to FIG. 2, the flowchart shows exemplary steps for automatically configuring a network entity, such as an IP phone 12a supplied by a manufacturer or a network equipment provider. For convenience the ensuing description will focus on an IP phone 12a for participation within the packet-switched network 16. In one exemplary situation, service providers 18a, 18b, 18c, may purchase the same IP phone 12a, having identical functions and capabilities, from one manufacturer or network equipment provider, for deployment within their own sub-network, or network 16. Oftentimes each of the service providers 18a, 18b, or 18c requires different configurations settings for the same IP phone 12a for full functionality on their own sub-network, or to access the service provider's resources or services. Therefore, the configuration settings are typically service provider-specific, as well as manufacturer-specific, and so there is a lack of interoperability between the service providers 18a, 18b, and 18c. This is often frustrating to an end-user desiring to seamlessly switch between service providers 18a, 18b or 18c, while using the same IP phone 12a.

A method for automatically configuring the IP phone 12a for use with at least one service provider 18a, 18b or 18c, is thus desirable to an end-user. An exemplary method for configuring the IP phone 12 comprises the step(s) of assigning an identifier to the IP phone 12a, the identifier may be a unique identifier, or a class identifier. One form of unique identification is provided by a globally unique network interface identifier (media access control (MAC) address). The unique MAC address is assigned to the IP phone 12a by the manufacturer or the network equipment provider (step 100). The MAC address is associated with the IP phone 12a's network interface adapter for coupling to the network 16, and includes an encoding comprising six groups of two hexadecimal digits, for example 00-a1-b2-b3-c4-d5. The first three octets (in transmission order) 00-a1-b2 identify the manufacturer (or organization) that issued the identifier (and hence the network interface adapter) and are known as the Organizationally Unique Identifier (OUI). The next three octets, b3-c4-d5, are assigned by that organization in any suitable manner but subject to the constraint of uniqueness.

The computer-readable medium of the IP phone 12a is included with factory-set default configuration data, such as, DHCP settings (enabled), a URI to a central server 14 having information related to the IP phone 12a's configuration settings. The URI of the central server 14 may be a public name/IP address, for example, connect.aastra.com, however, the URI may be customized as part of the branding for a partner/customer in an OEM agreement. Also, the computer-readable medium, or firmware, is coded to execute instructions for communicatively coupling the IP phone 12a to the central server 14 (step 102). The IP phone 12a automatically initiates a discovery process, in which it sends messages over any suitable transport protocol, such as UDP, TCP, TLS, HTTP(S), FTP, or TFTP, in order to retrieve its settings from a remote central server 14. The instructions are simply steps to be carried out by a processor, and may be provided by hardware, software, firmware, or any suitable combination thereof.

As part of the provisioning process the MAC address of the IP phone 12a, is associated with at least of the service providers 18a, 18b, or 18c (step 104), at the central server 14. Preferably, a central server 14 includes a database 22 for storing the records of the MAC addresses and the associated service provider 18a, 18b, or 18c, such as a first mapping table which is maintained in a memory associated with the central server 14 (step 106), as shown in FIG. 3a. For each customer or service provider 18a, 18, or 18c, a password protected account is created on the central server 14. The database 22 may be populated through a web portal accessible to the service providers 18a, 18b, 18c, or via a suitable API. The central server 14 includes an admin web portal via certain administrative tasks may be performed, such as: Create/Modify/Delete a customer account, Create/Modify/Delete a record. For example, when a customer account is deleted, all the records linked to this account are deleted. The customer accounts are stored in the database 22, and may include the following fields: Name, Password, Company, Contact name, Email address, Phone number, and Last login. As stated above, every MAC address added to the central server database 22a is linked to one customer account.

Each service provider 18a, 18b, or 18c is provided with a configuration server 20a, 20b or 20c having configuration settings for the IP phone 12a (step 108). The configuration servers 20a, 20b, 20c are coupled to the central server 14a, such that queries for configuration settings may be redirected thereto based on the first mapping table. The configuration server 20a, 20b or 20c includes configuration settings specific to the IP phone 12a with specific MAC addresses. Each service provider 18a, 18b or 18c thus includes a second mapping table with MAC addresses and associated configuration settings data in a database associated with each of the configuration servers 20a, 20b or 20c. As each IP phone 12a is typically identified by its MAC address, the configuration files on the configuration server 20a may be named using this information, for example, a configuration file named iphone12a-mac-00-a1-b2-b3-c4-d5.cfg would correspond to the IP phone 12a having 00-a1-b2-b3-c4-d5 as its MAC address. The configuration settings may include phone specific configuration information, and platform specific configuration information, such as, but not limited to, the type of phone, carrier, service, or enterprise system information, central server(s) URIs, configuration server(s) URI, port assignments, registration information, dial plan, NTP time settings, soft-keys, XML services and applications, SIP registration information, usernames and passwords, phone book directory, speaker volume settings and so forth. Firmware upgrades/downgrades may also be provided to the IP phone 12a based on the MAC address. An exemplary second mapping configuration table includes: MAC address, AccountID, Date and time of last update, Transport Mechanism, Parameter 1, Parameter 2, Parameter 3, Parameter n, as shown in FIG. 3b.

The central server 14 includes a user Web portal to allow the customers or service providers 18a, 18b, 18c to configure the MAC address of the IP phones 12a and the associated configuration parameters. The customers or service providers 18a, 18b, 18c access the Web portal using an account name and password, and may perform a number of administrative operations, such as, adding a record, modifying a record, deleting a record, change the account password, or upload an excel file or a csv file with a plurality of MAC addresses when configuring a large number of IP phones 12a. Alternatively, an XML API may be used to add such records. The central sever 14 verifies that each MAC address to be added is unique before inclusion in the database 22.

In execution, the IP phone 12a software application code causes the processor to transmit a first signal to request configuration settings associated with the IP phone 12a (step 110) from the central server 14. In step 112, the central server 14 receives a request for configuration settings from the IP phone 12a. The request includes the identity data of the IP phone 12a, such as the unique MAC address. Upon receipt of the request, the central server 14 processes the request to determine whether the first mapping table comprises the unique MAC address associated with the request, and also determines which of the plurality of service providers 18a, 18b, 18c the MAC address belongs to. Once such a determination has been established, the central server 14 then redirects the request to an appropriate service provider 18a, 18b or 18c, as per first mapping table (step 114). In step 116, a configuration server 20a, 20b or 20c, associated with the appropriate service provider 20a, 20b or 20c, selects the configuration settings for the IP phone 12a with that specific MAC address as per second mapping table, and forwards the relevant configuration settings data to the IP phone 12a. As is apparent from the above-noted exemplary steps, the IP phone 12a is configured for use with at least one service provider 18a, 18b or 18c, without the requirement for any user intervention, except to power-on the IP phone 12a and connect it to the network. Therefore, the service provider 18a, 18b or 18c, or the end-user is required to enter the configuration settings manually, thus mitigating against human error. The service providers 18a, 18b, 18c may thus drop ship the IP phone 12a at the user location, and the IP phone 12a is ready for use out of the box, as the IP phone 12a is auto-configured in the background and without user input.

In another exemplary embodiment, similar steps may be followed for automatically configuring different IP devices, such as an IP phone 12a from manufacturer A, an IP phone 12b from manufacturer B, an IP phone 12a from manufacturer C, and all to be provisioned by a single service provider 18a, wherein each phone 12a, 12b, or 12c includes require different configuration settings. As an example, all IP phones 12a from manufacturer A, e.g. Aastra Telecom, Canada, comprise the OUI 00-10-BC, and phone 12b from manufacturer C, e.g. MATRA, France comprise the OUI 08-00-71, and IP phones 12c from manufacturer C, e.g. DeTeWe-Deutsche Telephonwerke, Germany, comprise the OUI 00-30-42. The central server 14 thus includes a centralized repository having a master table associating all MAC address starting with 00-10-BC, 08-00-71 and 00-30-42, and/or including a range of remaining octets assigned by the manufacturer, to service provider 18b. Therefore, the service provider A includes a similar table (Table A) having a list of the resources for IP phones 12a, 12b, 12c OUIs starting with 00-10-BC, 08-00-71 and 00-30-42, as part of the configuration server 20a associated with service provider 18a. Therefore, a single set of resources or configuration settings may be applied to particular OUIs and/or a range of trailing octets, or for a range of MAC addresses, or for a certain class of devices 12a, 12b, and 12c. This arrangement thus allows for all IP phones 12a from manufacturer A with OUI 00-10-BC to receive the same configuration settings, while all IP phones 12b from manufacturer B with OUI 08-00-71 to receive the same configuration settings. Such an arrangement may be desirable to reduce the processing load on the central redirect server 14, and may improve robustness and allows for considerable network scalability. Thus, when an end user powers on a phone 12b and connects it to the network 16, the phone 12b immediately connects to the central server 14, which captures the OUI part of the MAC address (08-00-71) and the trailing octets, and refers to the master table to determine whether the MAC address falls within the range of MAC addresses for any of the service providers 18a, 18b, or 18c. The request is subsequently forwarded to the appropriate service provider 18b with configuration server 20b which selects the appropriate configuration settings for the IP phone 12b using the second mapping table, and the configuration settings data is subsequently sent to the IP phone 12b via a suitable protocol. Mass deployment for a hosted environment may thus be substantially simplified, and service providers may offer enhanced centralized value added services.

In yet another exemplary embodiment, when booting, the IP phone 12a initiates the discovery process automatically to look for a configuration server 20a 20b or 20c to retrieve its configuration data and/or its firmware. The boot process includes checking whether DHCP option 66 (bootp) is enabled to automatically push the TFTP server address to the IP phone 12a, and running an auto-discovery process using mDNS. If a local configuration server can not be located or does not include the settings for that particular IP phone 12a, then after a predefined period (on timeout), the IP phone 12a initiates a search for one or more public/enterprise servers on a WAN or the Internet. These public/enterprise servers may be maintained by individuals, or groups of individuals, corporations, network equipment providers, manufacturers, organisations, and include information related to configuration settings for a plurality of OUIs, MAC addresses, class identifiers, or other identifiers. For example, configuration settings for a plurality of OUIs, MAC addresses, class identifiers, or other identifiers may be uploaded to these public/enterprise servers, and updated periodically with configuration settings or pointers to the appropriate configuration servers, which may also be public or enterprise servers a WAN or the Internet. Typically, in a managed enterprise LAN, or SOHO network, environment with DHCP being enabled, the configuration settings are provided using Option 66/Option 67. In addition to its IP address, the DHCP server could provide the IP phone 12a with a DNS server, a default gateway. It can also be configured to provide the IP address of the central server 14. If the URI of the central server 14 is specified, the IP phone 12a uses any suitable protocol to contact the central server 14 on the network 16.

In yet another exemplary embodiment, the IP phone 12a can be automatically configured out of the box by connecting it to the network 16, and allowing the user to select and/or set up services via an integrated selection mechanism. The end-user may choose a plan, value-added features or quality of service. For example, based on the identifier (MAC address) contained in the configuration request, the central server 14 directs the request to the appropriate service provider 18a with configuration server 20a. Having received the request from the central server 14, the configuration server 20a may require authentication of the IP phone 12a, and thus sends an acknowledgment of receipt to the IP phone, along with a request for a Username and/or Password, or other credentials (as provided by the service provider 18a). After validation of the user credentials, the configuration settings data is then sent to the IP phone 12a. Alternatively, the process of authentication may be performed at the central server 14, or in conjunction with the configuration server 20a, if so designed. The central server 14 can also serve as a portal to partner services.

In yet another exemplary embodiment, the IP phone 12a includes a default "home" location, similar to a home page for an Internet browser, as part of is factory-set default configuration settings. Thus, at boot-up the IP phone 12a automatically seeks this default page, or when it is in an environment that does not present the IP phone 12a with configuration or service options. The home page presents information such as links, portals, menus, or other network connections or information to the device 12a. Alternatively, if the IP phone 12a is coupled to the network 16 and the MAC address (or other identifier/address) is not recognized by the central server 14 as being associated with a service provider 18a, 18b, or 18c, a menu may be presented on the IP phone 12a, via at least one of the I/O devices, with a choice of suitable service providers 20a, 20b, or 20c. These options can be extended to include not only the service provider 20a, 20b, or 20c, but other options and configurations within each service provider 20a, 20b, or 20c, such as plan, value-added features or quality of service.

In yet another exemplary embodiment, the network entity 12a includes a class identifier, such that the service provider/VOIP provider dictates its service offering in terms of both quality of service and value-added features based on class identifier. Therefore, the central server 14a and/or configuration server 20a, 20b, 20c, provides configuration settings for that particular class of device 12a. For example, certain network entities 12a, 12b may be used only in enterprise environments, therefore the settings may include priority paths for voice over IP, such that the network connection is managed and optimized for voice traffic to allow for superior quality of service. Other features may include call transcription or enhanced privacy for voice traffic, such as Secure VoIP using suitable cryptographic schemes. Other network entities 12c may be classified as consumer devices, and may include default settings that allow call monitoring, linking to home alarm systems, compatibility with TiVo™ from TIVO, USA.

In yet another exemplary embodiment, an IP phone 12a is coupled to a network 16, and at least central server 14a or configuration server 20a, 20b or 20c automatically detects that the IP device 12a is coupled to the network 16, and provides the relevant configuration information related to automatically configuring the IP phone 12a.

In yet another exemplary embodiment, the IP endpoint 12a may be programmed (firmware and/or software program) to contact the redirect server 14, or a plurality of redirect servers, each time it is powered on, rebooted or reset, or relocated within the same network or another network, in order receive settings data for auto-configuration, or firmware updates/downgrades.

In yet another exemplary embodiment, the redirect server 14 serves as a proxy or intermediary, by communicating with one of the configuration servers 20a, 20b or 20c to directly request and acquire the configuration settings data, and then forwarding the configuration setting data to the network entity 12a. Alternatively, the network entity 12a is programmed (firmware and/or software program) to contact the central server 14 to request configuration information, and the redirect server 14 responds to the network entity 12a with the URI to a suitable configuration server 20a that the network entity 12a should contact directly to request the configuration settings data. The configuration server 20a responds with the configuration information specific for that network entity 12a, based on the second mapping table.

In yet another exemplary embodiment, the computer-readable medium of the network entity 12a is included with a plurality of URIs to different redirect servers 14 and/or different configuration servers 20a, 20b, 20c associated with a plurality of service providers 18a, 18b, 18c or ITSPs, commercial voice over IP network providers, carriers, and so forth. For example, the network entity 12a includes URIs to all the configuration servers 20a, 20b, 20c associated with most of the major carriers or service providers, such as AT&T CallVantage, Verizon, bellshare, BT Group, Vonage, Skype, Packet8, Time Warner, Qwest or Comcast. As such, the program code causes the network entity 12a to send, or broadcast, at least one request for information related to its configuration settings, and at least one of the service providers 18a, 18b, or 18c, ITSPs, commercial voice over IP network providers or carriers responds with the requisite configuration information.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. A method for automatically configuring at least one network entity for participation in a network, said at least one network entity being associated with at least one service provider, said method comprising the steps of:
   assigning an identifier to said at least one network entity, wherein said identifier being any of a unique identifier or a class identifier;
   associating said identifier with at least one service provider;
   providing a central server having a reference table for mapping said identifiers to at least one of said service providers,
   providing a configuration server associated with each of said service providers, said configuration server having configuration settings data for said at least one network entity;
   including in a non-transitory computer-readable medium of said at least one network entity comprising instructions executable by a processor to cause said processor to perform the steps of communicating with said central server or said configuration server;
   causing said at least one network entity to automatically request configuration settings data from said central server when coupled to said network, said request including said network entity's identifier;
   receiving said request at said central server and determining which of said at least one of said service providers is associated with said identifier;
   said central server redirecting said request to an appropriate configuration server having said configuration settings data specific to said identifier;
   said configuration server providing said configuration settings data to said at least one network entity; and
   wherein said configuration settings data comprises device specific configuration information, and platform specific configuration information, including any of type of device, carrier, service, or enterprise system information, central server(s) uniform resource identifiers (URI(s)), configuration server(s) uniform resource identifiers (URI(s)), port assignments, registration information, dial plan, network time protocol (NTP) time settings, soft-keys, extensible markup language (XML) services and applications, session initiation protocol (SIP) registration information, usernames and passwords, phone book directory, speaker volume settings; and
   whereby said at least one network entity is automatically configured without user intervention except to power-on and connect said at least one network entity to said network in order to contact said central server.

2. The method of claim 1 wherein said unique identifier is a MAC address.

3. The method of claim 1 wherein said class identifier is any of an organizationally unique identifier OUI, device type, user identifier, vendor-specified identifier, or a geographic identifier.

4. The method of claim 1 wherein said central server is coupled at least one redundant central server having a reference table for mapping said identifiers to at least one of said service providers.

5. The method of claim 1 wherein said computer-readable medium includes factory-set default configuration data having at least dynamic host configuration protocol (DHCP) settings enabled and at least one uniform resource identifier (URI) associated with said central server.

6. The method of claim 1 wherein said communication between said network entity and said central server and/or said configuration is conducted via suitable protocols including any of file transfer protocol (FTP), trivial file transfer protocol (TFTP), hypertext transfer protocol (HTTP), hypertext transfer protocol secure (HTTPs) or transmission control protocol (TCP).

7. A system for configuring a plurality of network entities for implementation in a network, each of said network entities being associated with an identifier, and each of said network entities being associated with at least one service provider, said system comprising:
- a central server with a reference table for mapping said identifiers to at least one of said service providers, wherein said identifier being any of a unique identifier or a class identifier;
- a configuration server associated with each of said service providers, said configuration server having configuration settings data for said at least one network entity;
- a non-transitory computer-readable medium in said at least one network entity comprising instructions executable by a processor to cause said processor to perform the steps of communicating with said central server or said configuration server, and causing said at least one network entity to automatically request configuration settings data from said central server when coupled to said network, said request including said network entity's identifier; and
- wherein said central server receives said request and determines which of said at least one of said service providers is associated with said identifier, and said central server redirects said request to an appropriate configuration server having said configuration settings data specific to said identifier; and
- wherein said configuration settings data includes device specific configuration information, and platform specific configuration information; and
- wherein said at least one network entity is automatically configured without user intervention except to power-on and connect said at least one network entity to said network in order to contact said central server.

8. The system of claim 7 wherein said central server is coupled at least one redundant central server having a reference table for mapping said identifiers to at least one of said service providers.

9. The system of claim 7 wherein said central server serves as a proxy or intermediary, by communicating with one of said configuration servers to directly request and acquire said configuration settings data associated with said identifier, and then passing said configuration setting data to said network entity having said identifier.

10. The system of claim 7 wherein said network entity is programmed to contact said central server to request configuration information, and said central server being coded to respond to said network entity with said URI to a suitable configuration server for said network entity to contact directly to request said configuration settings data.

* * * * *